(12) United States Patent
Matsuoka

(10) Patent No.: US 8,971,187 B2
(45) Date of Patent: Mar. 3, 2015

(54) COMMUNICATION RELAY DEVICE, COMMUNICATION RELAY SYSTEM, AND METHOD OF CONTROLLING COMMUNICATION RELAY DEVICE

(71) Applicant: Fujitsu Limited, Kawasaki-shi (JP)

(72) Inventor: Naoki Matsuoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 13/719,441

(22) Filed: Dec. 19, 2012

(65) Prior Publication Data

US 2013/0242737 A1 Sep. 19, 2013

(30) Foreign Application Priority Data

Mar. 16, 2012 (JP) .................................. 2012-061201

(51) Int. Cl.
*H04J 1/16* (2006.01)
*H04L 12/803* (2013.01)

(52) U.S. Cl.
CPC ............ *H04L 47/125* (2013.01); *H04L 47/122* (2013.01)
USPC ............................ 370/235; 370/241; 370/392

(58) Field of Classification Search
CPC ....... H04L 45/72; H04L 45/74; H04L 45/745; H04L 47/00; H04L 47/10; H04L 47/11; H04L 47/122

USPC .................. 370/229–235, 241–252, 389–392
See application file for complete search history.

(56) References Cited

U.S. PATENT DOCUMENTS

| 2011/0040892 A1* | 2/2011 | Amemiya et al. ............ 709/235 |
| 2012/0163176 A1* | 6/2012 | Matsuoka ..................... 370/235 |
| 2012/0307826 A1* | 12/2012 | Matsuoka ..................... 370/390 |

FOREIGN PATENT DOCUMENTS

| JP | 11-27320 | 1/1999 |
| JP | 2002-281047 A | 9/2002 |
| JP | 2005-322033 A | 11/2005 |

* cited by examiner

*Primary Examiner* — Kan Yuen
(74) *Attorney, Agent, or Firm* — Fujitsu Patent Center

(57) ABSTRACT

A CPU load monitoring unit monitors a load of a server that receives and processes data. An ARP table chance instructing unit instructs a second information processing device, which transmits data in which an IP address of the server is designated as a transmission destination toward a MAC address associated with the designated IP address, to associate an IP address oil the server with a MAC address of a communication relay device when the load of the server is a threshold value or more. A data relay unit receives data in which the IP address of the server is designated as the transmission destination from a client A transmission rate adjusting unit transmits the data received by the data relay unit to the server at a predetermined transmission rate.

9 Claims, 16 Drawing Sheets

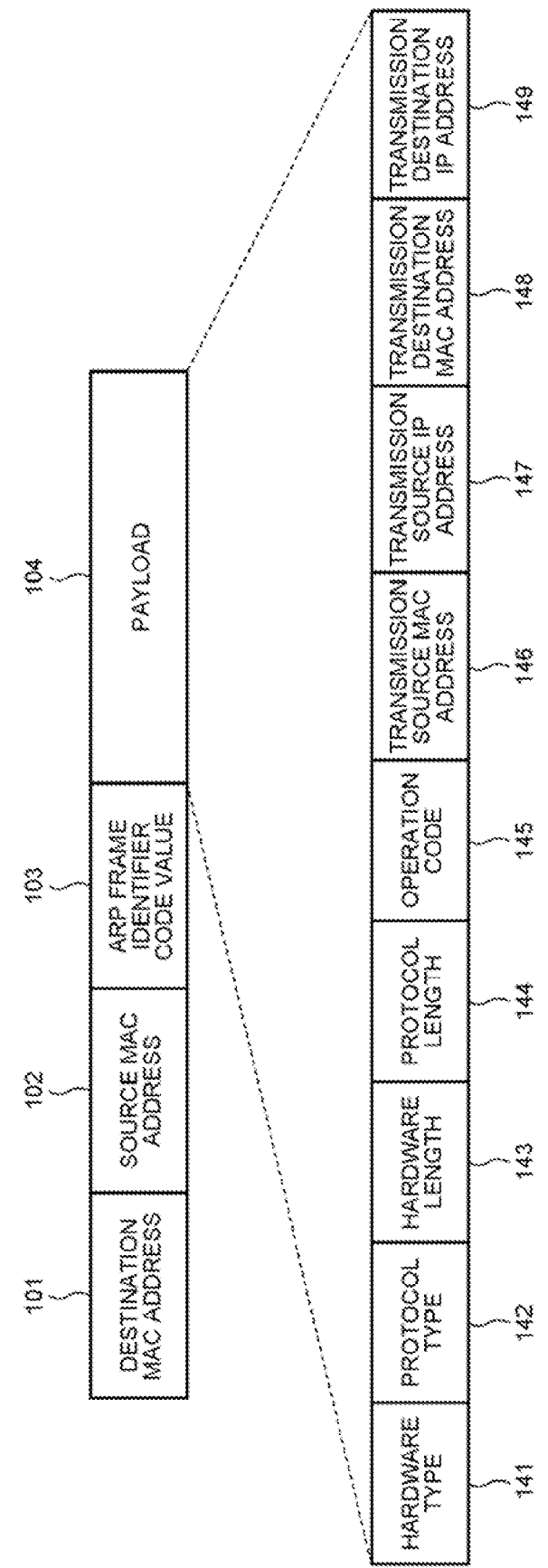

FIG.3

| DESTINATION MAC ADDRESS | BROADCAST ADDRESS (FF:FF:FF:FF:FF:FF) |
|---|---|
| SOURCE MAC ADDRESS | MAC ADDRESS OF COMMUNICATION RELAY DEVICE 1 |
| TRANSMISSION SOURCE MAC ADDRESS | MAC ADDRESS OF COMMUNICATION RELAY DEVICE 1 |
| TRANSMISSION SOURCE IP ADDRESS | IP ADDRESS OF SERVER 3 |
| TRANSMISSION DESTINATION MAC ADDRESS | MAC ADDRESS OF COMMUNICATION RELAY DEVICE 1 |
| TRANSMISSION DESTINATION IP ADDRESS | IP ADDRESS OF SERVER 3 |

FIG.4

| DESTINATION MAC ADDRESS | BROADCAST ADDRESS (FF:FF:FF:FF:FF:FF) |
|---|---|
| SOURCE MAC ADDRESS | MAC ADDRESS OF COMMUNICATION RELAY DEVICE 1 |
| TRANSMISSION SOURCE MAC ADDRESS | MAC ADDRESS OF SERVER 3 |
| TRANSMISSION SOURCE IP ADDRESS | IP ADDRESS OF SERVER 3 |
| TRANSMISSION DESTINATION MAC ADDRESS | MAC ADDRESS OF SERVER 3 |
| TRANSMISSION DESTINATION IP ADDRESS | IP ADDRESS OF SERVER 3 |

FIG.12

| DESTINATION MAC ADDRESS | BROADCAST ADDRESS (FF:FF:FF:FF:FF:FF) |
|---|---|
| SOURCE MAC ADDRESS | MAC ADDRESS OF COMMUNICATION RELAY DEVICE 1 |
| TRANSMISSION SOURCE MAC ADDRESS | MAC ADDRESS OF SERVER 3 |
| TRANSMISSION SOURCE IP ADDRESS | IP ADDRESS OF SERVER 3 |
| TRANSMISSION DESTINATION MAC ADDRESS | MAC ADDRESS OF SERVER 3 |
| TRANSMISSION DESTINATION IP ADDRESS | IP ADDRESS OF SERVER 3 |

FIG.13

| DESTINATION MAC ADDRESS | BROADCAST ADDRESS (FF:FF:FF:FF:FF:FF) |
|---|---|
| SOURCE MAC ADDRESS | MAC ADDRESS OF COMMUNICATION RELAY DEVICE 1 |
| TRANSMISSION SOURCE MAC ADDRESS | MAC ADDRESS OF COMMUNICATION RELAY DEVICE 1 |
| TRANSMISSION SOURCE IP ADDRESS | IP ADDRESS OF SERVER 3 |
| TRANSMISSION DESTINATION MAC ADDRESS | MAC ADDRESS OF COMMUNICATION RELAY DEVICE 1 |
| TRANSMISSION DESTINATION IP ADDRESS | IP ADDRESS OF SERVER 3 |

US 8,971,187 B2

COMMUNICATION RELAY DEVICE, COMMUNICATION RELAY SYSTEM, AND METHOD OF CONTROLLING COMMUNICATION RELAY DEVICE

CROSS-REFERENCE TO RELATED APPLICATION

This application is based upon and claims the benefit of priority of the prior Japanese Patent Application No. 2012-061201, filed on Mar. 16, 2012, the entire contents of which are incorporated herein by reference.

FIELD

The embodiments discussed herein are directed to a communication relay device, a communication relay system, a method of controlling a communication relay device, and a communication relay program.

BACKGROUND

A decrease in a processing capability of an information processing device that is executing an application has great influence on a sensory performance of an application user. For example, when an information processing device receives an excessive request of a processing capability or more, other internal processing is delayed due to an excessive request reception process, and the processing capability of the information processing device is remarkably lowered.

Particularly, when a use rate of a central processing unit (CPU) exceeds 100%, the processing capability of the information processing device dramatically drops compared to when a use rate is 80% or 90%.

In this regard, there is a related aria which when a steady overload state occurs on a processing capability of a server, a load is distributed to a plurality of servers, for example, by the introduction of a server load balance. Further, there is a related art in which when a server that delivers data to other processing devices is overloaded, one of the other processing devices is selected, and the selected processing device undertakes data delivery.

Patent Literature 1: Japanese Laid-open Patent Publication No. 11-027320
Patent Literature 2: Japanese Laid-open Patent Publication No. 2005-322033

However, in the related art using the load balance, for example, when a load distribution deviation occurs due to the load balance or when a huge request is transmitted through one flow, a large load is likely to be imposed on one information processing device. After all, in this case, the information processing device on which a large load is imposed is likely to suffer significant performance degradation.

Further, in the related art in which another processing device undertakes processing, for example, when a huge request is transmitted through one flow, a large load is likely to be eventually imposed on one information processing device.

A method of resolving an overload by transmitting a request transmission suppression instruction to a request transmission source is considered as a method of resolving a periodic overload state. However, in this method, an information processing device at both a request transmission side and an information processing device at a request reception side need to employ a complicated mechanism, and thus it is not easy to mitigate a processing load of an information processing device that receives data.

SUMMARY

According to an aspect of an embodiment, a communication relay device includes: a load monitoring unit that monitors a load of a first information procession device that receives and processes data; a correspondence instructing unit that instructs a second information processing device, which transmits data in which an IP address of the first information processing device is designated as a transmission destination toward a MAC address associated with the designated IP address, to associate an IP address of the first information processing device with a MAC address of the communication relay device when the load of the first information processing device is a threshold value or more; a data receiving unit that receives the data in which the IP address of the first information processing device is designated as the transmission destination from the second information processing device; and a transmitting unit that transmits the data received by the data receiving unit to the first information processing device at a predetermined transmission rate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a format of an address resolution protocol (ARP);

FIG. 3 is a diagram illustrating content of a GARP generated at the time of activation of a data relay function in the first embodiment;

FIG. 4 is a diagram illustrating content of a GARP generated at the time of deactivation of a data relay function in the first embodiment;

FIG. 12 is a diagram illustrating content of a GARP generated at the time or activation of a data relay function in the second embodiment;

FIG. 13 is a diagram illustrating content of a GARP generated at the time or deactivation of a data relay function in the second embodiment;

DESCRIPTION OF EMBODIMENTS

Preferred embodiments of the present invention will be explained with reference to accompanying drawings. A communication relay device, a communication relay system, a method of controlling communication relay device, and a communication relay program according to the present disclosure are not limited to the following embodiments.

[a] First Embodiment

Figure 1:
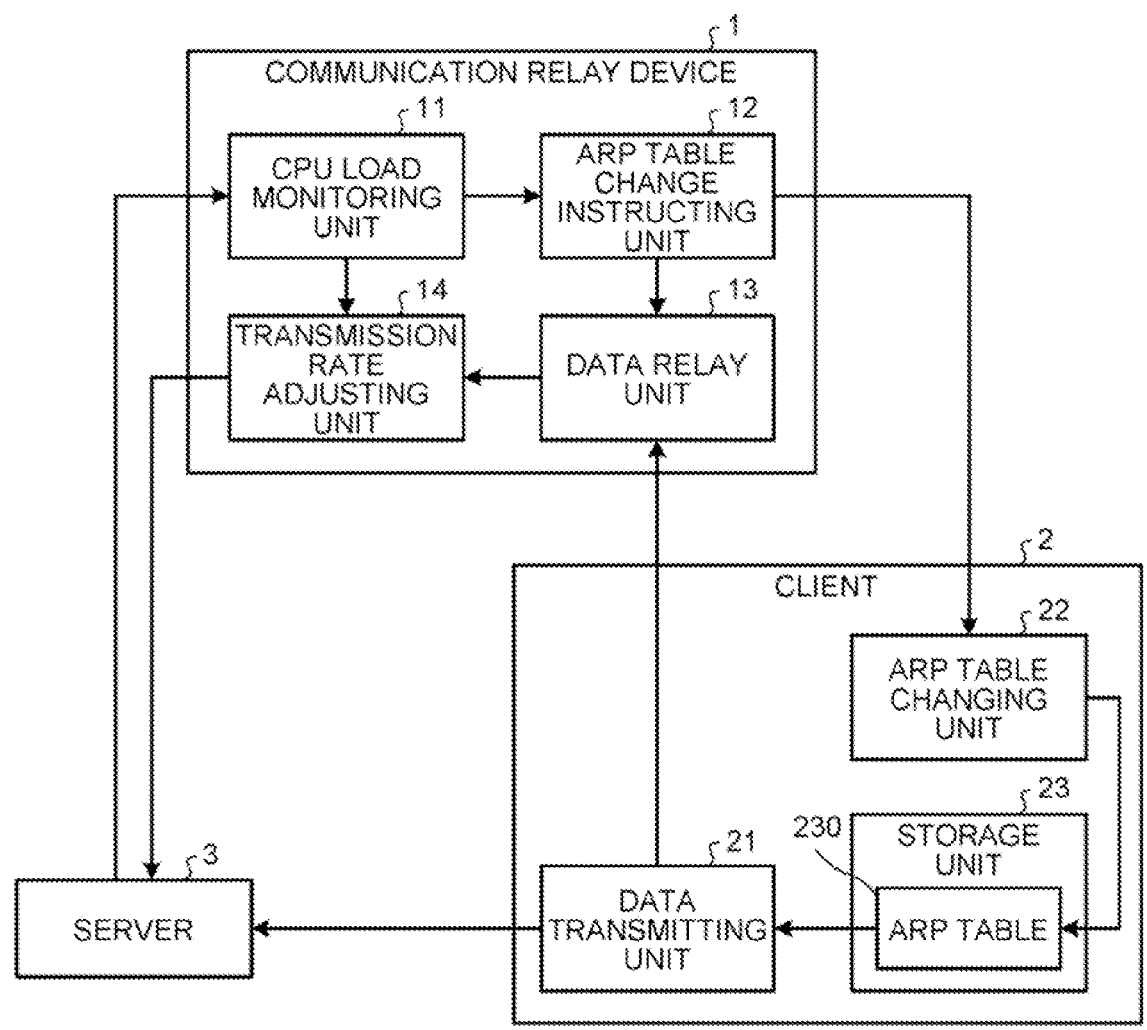
FIG. 1 is a block diagram of a communication relay system including a communication relay device according to a first embodiment.

FIG. 1 is a block diagram of a communication relay system including a communication relay device according to a first embodiment. The communication relay system according to the present embodiment includes a communication relay device 1, a client 2, and a server 3 as illustrated in FIG. 1. FIG. 2 is a diagram illustrating an example of a format of an address resolution protocol (ARP). Here, the present embodiment will be described in connection with an example in which the client 2 transmits data to the server 3, but the present invention is not limited to this example. The present invention is not particularly limited as long as both of a data transmission side host and a data reception side host are an information processing device that performs bats communication. For example, a data transmission side host may be a server, and a data reception side host may be a client, or a data transmission side host and a data reception side host may be a client. The communication relay device 1, the client 2, and the server 3 are connected via an L2 (layer 2) network.

The communication relay device 1 includes a CPU load monitoring unit 11, an ARP table change instructing unit 12, a data relay unit 13, and a transmission rate adjusting unit 14.

The CPU load monitoring unit 11 monitors a CPU load of the server 3. The CPU load monitoring unit 11 notifies the ARP table change instructing unit 12 of activation of a data relay function when a CPU load is a threshold value or more (this may be hereinafter referred to as an "overload"). For example, "use rate of CPU is 80%" is set as the threshold value of the CPU load in advance.

Further, when the CPU load is less than the threshold value (this may be hereinafter referred to as a "low load"), the CPU load monitoring unit 11 transmits a notice representing deactivation of the data relay function to the ARP table change instructing unit 12, and instructs deactivation of the data relay function. Here, in the present embodiment, the CPU load monitoring unit 11 decides whether or not to give the notice to the ARP table change instructing unit 12 using one threshold value, but this may be performed by any other method. For example, when the CPU use rate is 80% or more, the CPU load monitoring unit 11 notifies the ARP table change instructing unit 12 of activation of the data relay function. Thereafter, when the CPU use rate drops below 50%, the CPU load monitoring unit 11 notifies the ARP table change instructing unit 12 of deactivation of the data relay function. As described above, different threshold values may be used for activation and deactivation of the data relay function.

Here, when the notice representing activation of the data relay function is received from the CPU load monitoring unit 11, the ARP table change instructing unit 12 generates a gratuitous ARP (GARP).

Here, the GARP will be described. The ARP has the format illustrated in FIG. 2. FIG. 2 is a diagram illustrating an example of a format of the ARP. The ARP includes a destination MAC address 101, a source MAC address 102, an ARP frame identifier code value 103, and a payload 104. The destination MAC address is a MAC address representing the destination of the ARP. In case of a normal ARP request to inquire a MAC address corresponding to an IP address, the destination MAC address is broadcast. The source MAC address is a MAC address representing a transmission source of the ARP. The ARP frame identifier node value is a value representing the presence of the ARP.

The payload 104 includes a hardware type 141, a protocol type 142, a hardware length 143, a protocol length 144, and an operation code 145. The payload 104 further includes a transmission source MAC address 146, a transmission source IP address 147, a transmission destination MAC address 148 and a transmission destination IP address 149.

The hardware type 141 represents a used network. The protocol type 142 represents a protocol used for a network layer. The hardware length 143 represents the length of a MAC address. The protocol length 144 represents the length of an IP address. The operation code 145 represents either an ARP request or an ARP reply.

The transmission source MAC address 146 is a MAC address of a transmission source that transmits an ARP. The transmission source IP address 147 is an IP address of a transmission source that transmits an ARP. The transmission destination IP address 149 is an IP address corresponding to a MAC address that a device of a transmission source is requested to acquire in case of the ARP request. The transmission destination MAC address 148 is a MAC address corresponding to a transmission destination IP address. In other words, in case of the ARP request, the transmission destination MAC address 149 is a MAC address that a device of a transmission source is requested to acquire.

In case of a normal ARP that requests a MAC address corresponding to a specific IP address, the transmission source IP address 147 is different from the transmission destination. IP address 149. On the other hand, in case of the GARP, the transmission source IP address and the transmission destination IP address refer to the same ARP. In the present embodiment, when the GARP is received, the client 2 updates an ARP table which will be described below by rewriting a MAC address corresponding to an IP address which is recorded in a transmission source IP address and a transmission destination IP address of the GARP to a transmission source MAC address. The client having this function may be referred to as a "client corresponding to GARP."

Here, upon receiving the notice representing activation of the data relay function from the CPU load monitoring unit 11, the ARP table change instructing unit 12 generates a GARP used to change the MAC address corresponding to the IP address of the server 3 to the MAC address of the communication relay device 1. In other words, the GARP is pseudo information used to transmit data to be transmitted to the server 3 to the communication relay device 1. FIG. 3 is a diagram illustrating content of a GARP generated at the time of activation of the data relay function in the first embodiment. Specifically, both the transmission source IP address 147 and the transmission destination. IP address 149 are the IP address of the server 3. Through this, an ARP can be specified a GARP. Further, both the transmission source MAC address 146 and the transmission destination MAC address 148 are the MAC address of the communication relay device 1 as an own device. Thus, the client that has received the GARP rewrites the MAC address corresponding to the IP address of the server 3 which is recorded in the ARP table to the MAC address of the communication relay device 1.

In addition, the ARP table change instructing unit 12 notifies the data relay unit 13 of activation of the data relay function together with the IP address and the MAC address of the overloaded server 3.

Further, upon receiving the notice representing deactivation of the data relay function in a state in which transmission of data to the server 3 is being relayed, the ARP table change instructing, unit 12 generates is GARP used to return the MAC address corresponding to the IP address of the server 3 to the MAC address of the server 3. In other words, the GARP is regular information used to transmit data to be transmitted to the server 3 to be properly transmitted to the server 3. FIG. 4 is a diagram illustrating content: of a GARP generated at the time of deactivation of the data relay function in the first embodiment. Specifically, both the transmission source IP address 147 and the transmission destination IP address 149 are the IP address of the server 3. Through this, an ARP can be specified a GARP. Further, both the transmission source MAC address 145 and the transmission, destination MAC address 148 are the MAC address of the server 3. Thus, the client that has received the GARP rewrites the MAC address corresponding to the IP address of the server 3 which is recorded in the ARP table to the MAC address of the server 3.

In addition, the ARP table change instructing unit 12 transmits the notice representing deactivation of the data relay function to the data relay unit 13.

The data relay unit 13 receives a notice to perform a relay of data directed to the server 3 from the ARP table change instructing unit 12 together with the IP address and the MAC address of the overloaded server 3. The data relay unit 13 holds the received IP address and the MAC address of the server 3. Then, the data relay unit 13 activates a message relay function.

The data relay unit 13 whose message relay function is activated receives data directed to the server 3 from a data transmitting unit 21 of the client 2. The data directed to the server 3 transmitted from the data transmitting unit 21 of the client 2 includes the IP address of the server 3. Thus, the data relay unit 13 acquires the MAC address of the server 3 from information of the MAC address corresponding to the held IP address. Then, the data relay unit 13 changes a MAC address of a transmission destination of the data directed to the server 3 to the MAC address of the server 3. Thereafter, the data relay unit 13 outputs the chute directed to the server 3 to the transmission rate adjusting unit 14.

Further, upon receiving the notice representing deactivation of the data relay function of the server 3 from the ARP table change instructing unit 12 in the state in which the message relay function is activated, the data relay unit 13 deactivates the message relay function.

The transmission rate adjusting unit 14 receives an input of data directed to the server 3 from the data relay unit 13. Further, the transmission rate adjusting unit 14 acquires the CPU load to of the server 3 from the CPU load monitoring unit 11. Then, the transmission rate adjusting unit 14 accumulates received data, and transmits data to the server 3 while adjusting the transmission rate such that the CPU load of the server 3 does not exceed a predetermined value. Fox example, the transmission rate adjusting unit 14 may store stepwise transmission rate suppression rates. The transmission rate adjusting unit 14 adjusts the transmission rate using a low suppression rate, but, in this case, when the CPU load exceeds a predetermined value, an transmission rate is adjusted using a higher suppression rate. A concrete example will be described under the assumption that the transmission rate adjusting unit 14 stores 10%, 20%, and 50% as the suppression rate, and the CPU use rate of 90% is stored as a predetermined value. Here, the suppression rate oil 10% means that transmission is performed at the transmission rate of 10% compared to when data is transmitted to the server 3 without any suppression in the transmission rate. The transmission rate adjusting unit 14 transmits data to the server 3 at the suppression rate of 10%. Then, the transmission rate adjusting unit 14 receives the CPU use rate of the server 3 from the CPU load monitoring unit 11. Here, when the use rate of the server 3 below 90% in this state, the transmission rate adjusting unit 14 maintains the suppression rate of 10%. However, when the use rate of the server 3 is larger than 90% in this state, the transmission rate adjusting unit 14 increases the suppression rate to 20%. Even in this case, when the use rate of the server 3 is larger than 90%, the transmission rate adjusting unit 14 increases the suppression rate to 50%. The transmission rate adjusting unit 14 corresponds to an example of a "transmitting unit."

Here, the example in which the suppression rate is increased has been described above, but when the suppression rate is decreased, the transmission rate adjusting unit 14 sequentially decreases the suppression rate according to the CPU load, in a similar manner.

In addition, in the present embodiment, the threshold value for activation of the data relay function and the predetermined value for decision of the suppression rate are different from each other but may be the same as each other. For example, as described above, the threshold value for activation of the data relay function may be different from the threshold value for deactivation of the data relay function, and the threshold value for activation of the data relay function may be equal to the predetermined value for decision of the suppression rate.

The client 2 includes the data transmitting unit 21, an ARP table changing unit 22, and a storage unit 23.

The storage unit 23 stores an ARP table 230. The ARP table 230 is a table in which an IP address and a MAC address are recorded in association with each other.

The data transmitting unit 21 acquires a MAC address corresponding to an IP address of a transmission destination to be included in data with reference to the ARP table 230. Then, the data transmitting unit 21 transmits data toward the acquired MAC address.

The description will proceed in connection with an example in which the MAC address of the server 3 is registered in the ARP table 230 in association with the IP address of the server 3. The data transmitting unit 21 acquires the IP address of the server 3 to be included in data directed to the server 3. Then, the data transmitting unit 21 acquirer the MAC address of the server 3 from the ARP table 230 as a MAC address corresponding to an IP address of the server 3. Then, the data transmitting unit 21 transmits data toward the MAC address of the server 3. In this case, the data transmitting unit 21 transmits data directed to the server 3 to the server 3 which is a normal destination.

Next, the description will proceed in connection with an example in which the MAC address of the communication relay device 1 is registered in the ARP table 230 in association with the IP address of the server 3. The data transmitting unit 21 acquires the IP address of the server 3 to be included in data directed to the server 3. Then, the data transmitting unit 21 acquires the MAC address of the communication relay device 1 from the ARP table 230 as the MAC address corresponding to the IP address of the server 3. Then, the data transmitting unit 21 transmits data toward the MAC address of the communication relay device 1. In this case, the data transmitting unit 21 transmits data directed to the server 3 to the communication relay device 1 which is a pseudo destination.

The ARP table changing unit 22 receives the GARP from the ARP table change instructing unit 12. Then, the ARP table changing unit 22 rewrites the ARP table such that the transmission source MAC address of the GARP is used as the MAC addresses corresponding to the IP addresses recorded in the transmission source IP address and the transmission destination IP address of the GRAP.

For example, when the GARP having the pseudo information illustrated in FIG. 3 is received, the ARP table changing unit 22 rewrites the MAC address corresponding to the IP address of the server 3 to the MAC address of the communication relay device 1. Further, when the GARP having the regular information illustrated in FIG. 4 is received, the ARP table changing unit 22 rewrites the MAC address corresponding to the IP address of the server 3 to the MAC address of the server 3.

The server 3 receives data from the data transmitting unit 21 and the transmission rate adjusting unit 14. Then, the server 3 processes data using the CPU.

Figure 5:
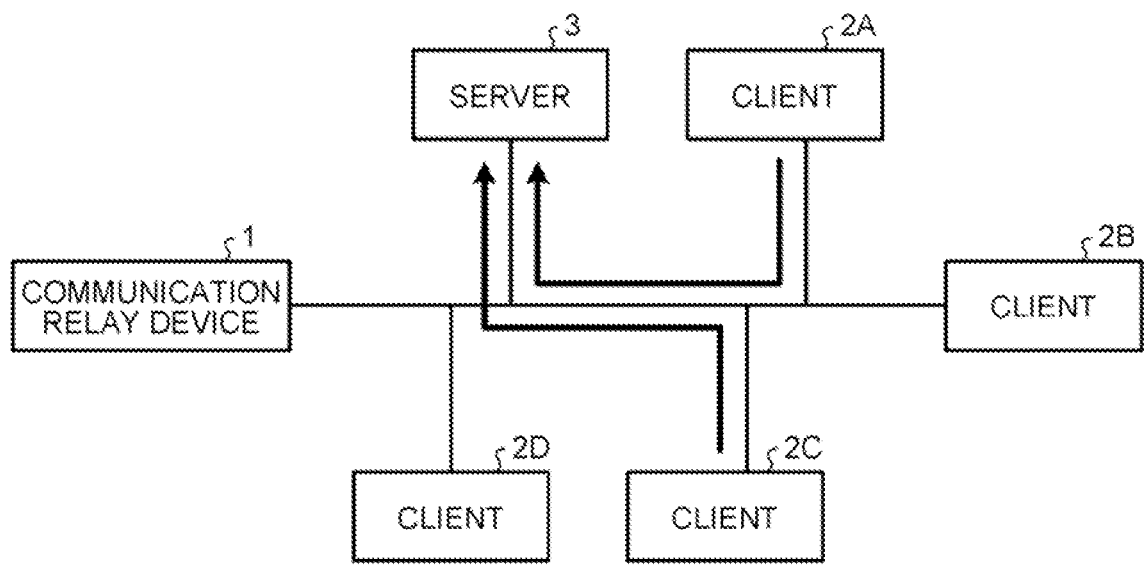
FIG. 5 is a diagram illustrating a data transmission state before an overload is imposed on a server.
Figure 6:
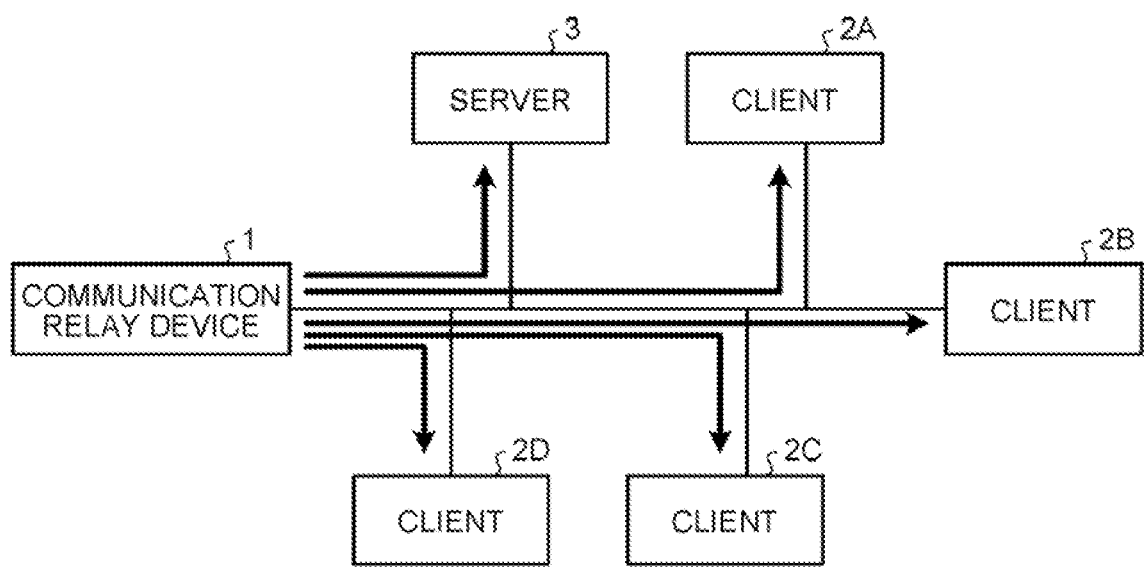
FIG. 6 is a diagram illustrating a GARP transmission state of when an overload is imposed on a server.
Figure 7:
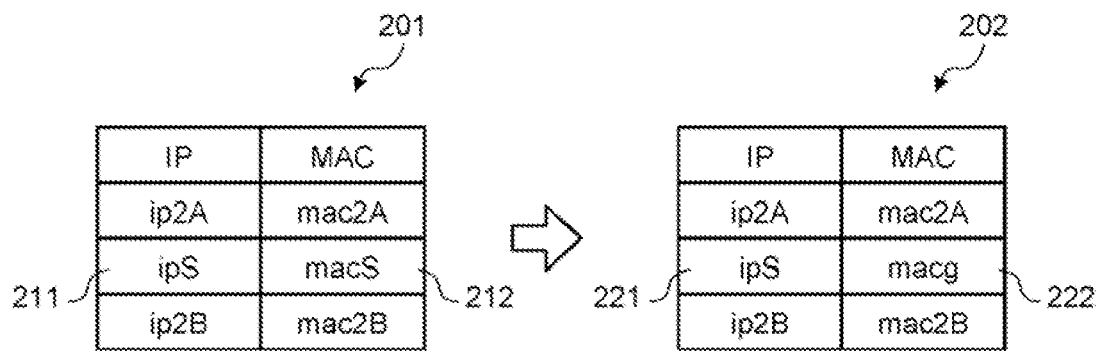
FIG. 7 is a diagram illustrating transition of an ARP table when an overload is imposed on a server.
Figure 8:
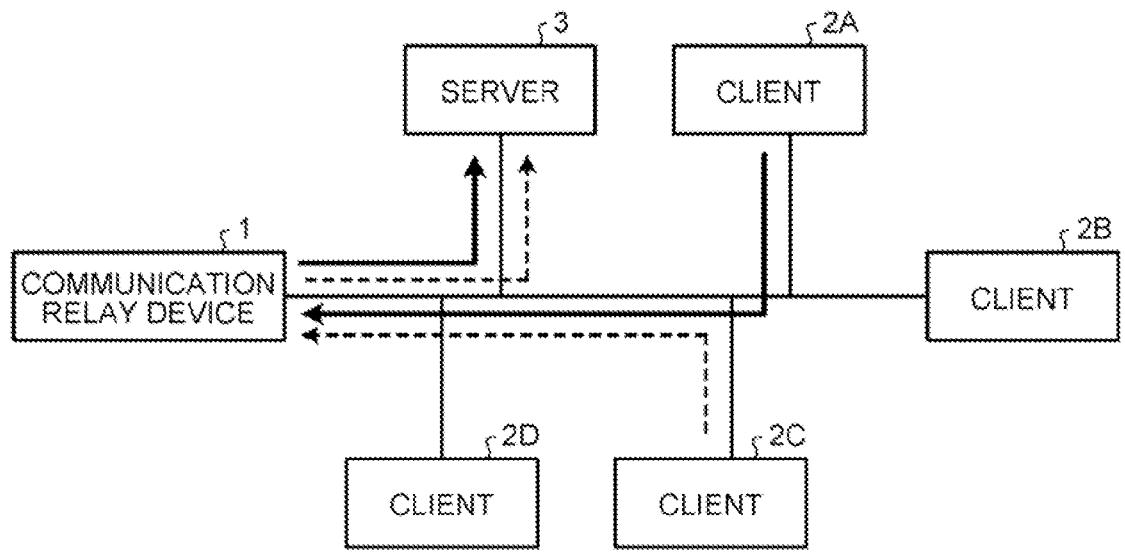
FIG. 8 is a diagram illustrating a data transmission state when a transmission rate is adjusted.
Figure 9:
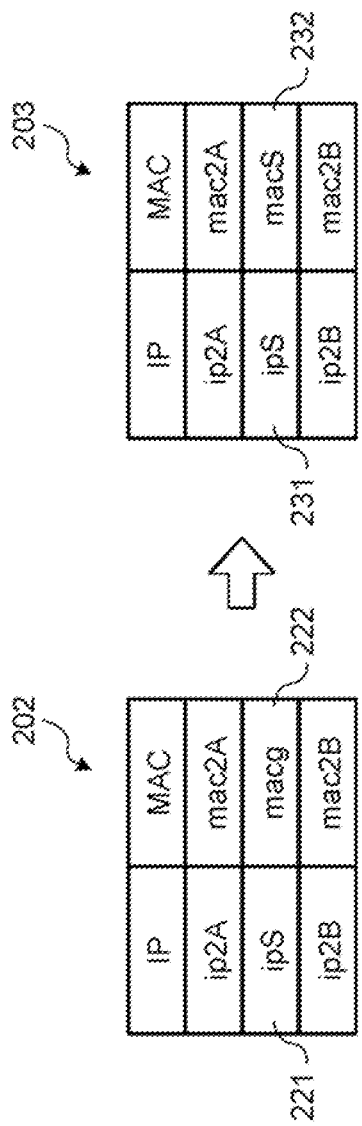
FIG. 9 is a diagram illustrating transition of an ARP table when a low load is imposed on a server.

Next, transition of the flow of data and transition of the ARP table when an overload is imposed on the server 3 and when a low load is imposed on the server 3 will be described with reference to FIGS. 5 to 9. FIG. 5 is a diagram illustrating a data transmission state before an overload is imposed on the server. FIG. 6 is a diagram illustrating a GARP transmission state of when an overload is imposed on the server. FIG. 7 is a diagram illustrating transition of the ARP table when an overload is imposed on the server. FIG. 8 is a diagram illustrating a data transmission state when the transmission rate is adjusted. FIG. 9 is a diagram illustrating transition of the ARP table when a low load is imposed on the server.

Here, the description will proceed in connection with an example in which clients 2A to 2D are arranged as the client 2. The communication relay device 1, the clients 2A to 2D, and the server 3 are connected to one another is the L2 network. In the following, macg is used as the MAC address of the communication relay device 1. Further, ip2A to ip2D are used as IP addresses of the clients 2A to 2D respectively, and mac2A to mac2D are used as the MAC addresses of the clients 2A to 2D. Further, ipS as used as the IP address of the server 3, and macS is used as the MAC address.

As illustrated in FIG. 5, when an overload is not imposed on the server 3, each of the clients 2A to 2D transmits data directly to the server 3. The communication relay device 1 monitors the CPU load of the server 3.

Here, when the communication relay device 1 detects en overload of the CPU of the server 3 in the state of FIG. 5, the communication relay device 1 broadcasts the GARP used to chance the MAC address corresponding to the IP address of the server 3 to the MAC address of the communication relay device 1 as illustrated in FIG. 6. As a result, the ARP table 230 in each of the clients 2A to 2D is undated.

The ARP table 230 in the client 2C will be described as an example. A table 201 of FIG. 7 represents the ARP table 230 of the client CC before an overload is imposed on the server. A table 202 represents the ARP table 230 of the client 2C after an overload is imposed on the server. In the table 201, ipS is recorded in an IP column 211 as the IP address of the server 3, and macS is recorded in a corresponding MAC column 212 as the MAC address of the server 3. Then, when the client 2 acquires the GARP of the pseudo information from the communication relay device 1, the table 201 is rewritten as in the table 202. In the table 202, ipS is recorded in an IP column 221 as the IP address of the server 3, and macg is recorded in a corresponding MAC column 222 as the MAC address of the communication relay device 1. The ARP table 230 oil each of the clients 2A to 2D is rewritten as described above.

Thereafter, the clients 2A to 2D transmit data directed to the server 3 with reference to the ARP table 230 having the state of the table 202, and thus the clients 2A to 2D actually transmit data directed to the server 3 to the communication relay device 1 as illustrated in FIG. 8. Then, the communication relay device 1 transmits data received from the clients 2A to 2D to the server 3 while adjusting the transmission rate. In FIG. 8, as an example, the flow of data when the client 2C transmits data toward the server 3 is indicated by a dashed line arrow, and the flow of data when the client 2A transmits data toward the server 3 is indicated by a solid line arrow.

In the state of FIG. 8, when the communication relay device 1 detects a low load of the CPU of the server 3, the communication relay device 1 broadcasts the GARP used to change the MAC address corresponding to the IP address of the server 3 to the MAC address of the server 3. As a result, the ARP table 230 in each of the clients 2A to 2D is updated.

The ARP table 230 is the client 2C will be described as an example. The table 202 of FIG. 9 is the same as the table 202 of FIG. 8, and represents the ARP table 230 of the client 2C when an overload is imposed on the server. Further, a table 203 represents the ARP table 230 of the client 2C after the server becomes a low load. In the table 202, ipS is recorded in the IP column 221 as the IP address of the server 3, and mice is recorded in the corresponding MAC column 222 as the MAC address of the communication relay device 1. Then, when the client 2 receives the GARP of the regular information from the communication relay device 1, the table 202 is rewritten to the table 203. In the table 203, ipS is recorded in an IP column 231 as the IP address of the server 3, and macS is recorded in a corresponding MAC column 232 as the MAC address of the server 3. The ARP table 230 of each of the clients 2A to 2D is rewritten as described above.

Thereafter, the clients 2A to 2D transmit data directed to the server 3 with reference to the ARP table 230 having the state of the table 203. In this case, the clients 2A to 2D transmit data directed to the server 3 directly to the server 3 as illustrated in FIG. 5 illustrating the state before the server is overloaded.

Figure 10:
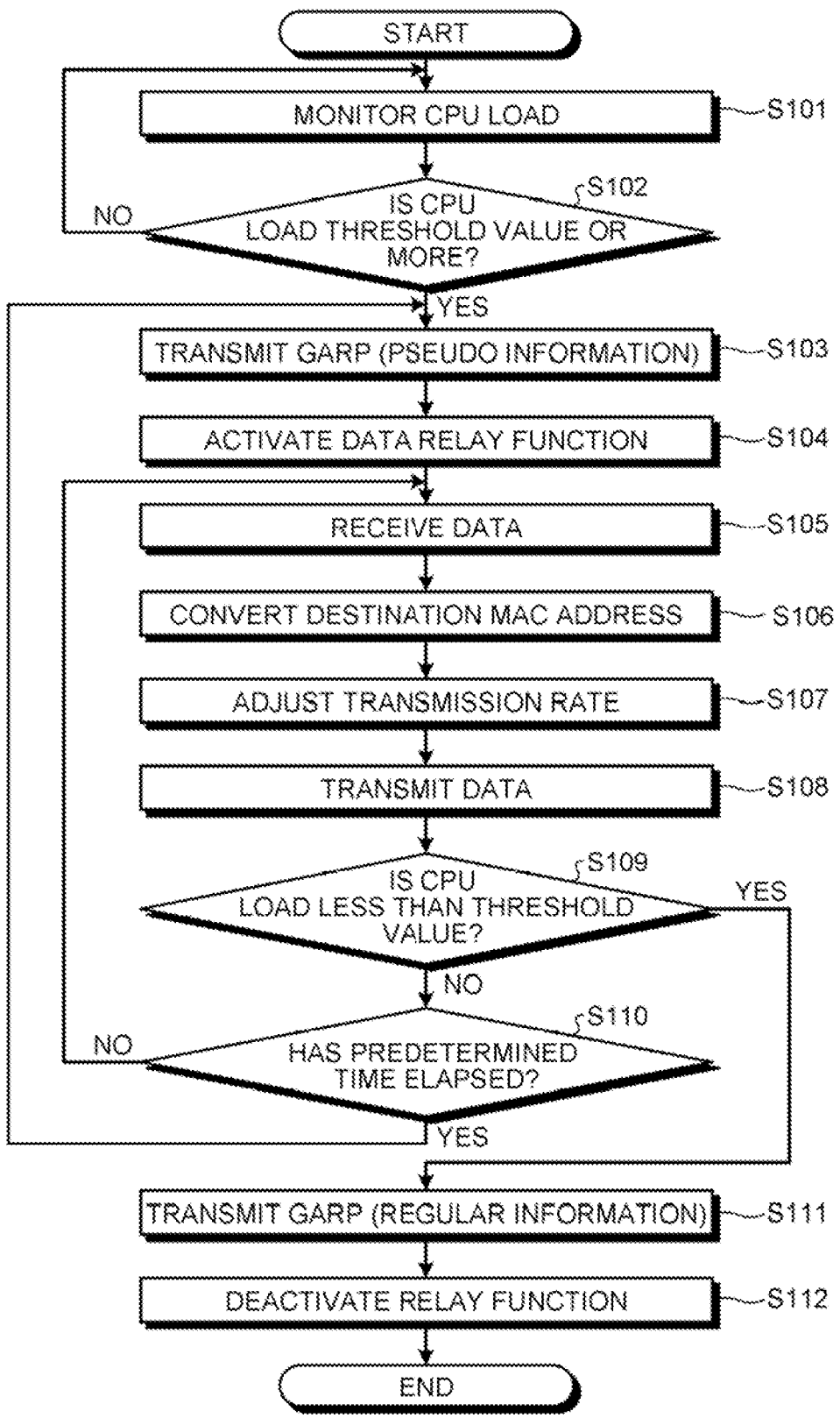
FIG. 10 is a flowchart illustrating a data relay process by a communication relay device according to the first embodiment.

Next, a data relay process by the communication relay device 1 according to the first embodiment will be described with reference to FIG. 10. FIG. 10 is a flowchart illustrating a data relay process by the communication relay device according to the first embodiment.

The CPU load monitoring unit. 11 monitors the CPU load of the server 3 (step S101). Then, the CPU load monitoring unit 11 determines whether or not the CPU load is a threshold value or more (step 3102). Here, when the CPU load is less than the threshold value No in step S102), the CPU load monitoring unit 11 returns to step S101.

However, when the CPU load is the threshold value or more (Yes in step S102), the CPU load monitoring unit 11 notifies the ARP table change instructing unit 12 of activation of the data relay function. In turn, the ARP table change instructing unit 12 transmits the GARP including the pseudo information in it broadcast manner (step S103).

Further, the ARP table change instructing unit 12 notifies the data relay unit 13 of activation of the data relay function together with the IP address and the MAC address of the server 3. In turn, the data relay unit 13 holds the IP address and the MAC address of the server 3 and activates the data relay function (step S104).

Thereafter, the data relay unit 13 receives data directed to the server 3 from the client 2 (step S105). Then, the data relay unit 13 converts the destination MAC address of the received data into the MAC address of the server 3 using the held IP address and the MAC address of the server 3 (step S106). Thereafter, the data relay unit 13 outputs data to the transmission rate adjusting unit 14.

The transmission rate adjusting unit 14 adjusts the transmission rate according to the CPU load of the server 3 (step S107). Then, the transmission rate adjusting unit 14 transmits data to the server 3 (step S108).

Thereafter, the CPU load monitoring unit 11 determines whether or not the CPU load is less than the threshold value (step S109). Here, when the CPU load is the threshold value or more (No in step S109), the ARP table change instructing unit 12 determines whether or not a predetermined time has elapsed (step S110). Here, when a predetermined time has not elapsed, the process returns to step S105. However, when a predetermined time has elapsed, the ARP table change instructing unit 12 returns to step S103.

Meanwhile, when the CPU load is less than the threshold value (Yes in step S109), the ARP table change instructing unit 12 transmits the GARP having the regular information to the client 2 (step S111). Then, the ARP table change instructing unit 12 notifies the data relay device of deactivation of the data relay function. In turn, the data relay unit 13 deactivates the data relay function (step S112).

Here, in the flow of FIG. 10, a series of processes until a low load is imposed on the server after an overload is imposed on the server has been described. However, the communication relay device 1 actually repeats the flow of FIG. 10.

As described above, when the load of the server exceeds the threshold value, the communication relay device according to the present embodiment receives data directed to the server from the client, and transmits data to the server while adjusting the transmission rate. As a result, in the information processing device that receives data, it is possible to reduce the risk that the CPU load steeply increases due to reception data. Further, according to the communication relay device according to the present embodiment, in both cases cc a long-term overload and a short-term overload, it is possible to mitigate the processing load of the information processing device, which is caused due to reception data.

In addition, the communication relay device according to the present embodiment mitigates the processing load of the information processing device that receives data through the simple configuration. Particularly, any special function needs to be added to the client side as long as the client side supports the GARP. Thus, it is possible to easily mitigate the processing load of the information processing device, which is caused due to reception data.

[b] Second Embodiment

Figure 11:
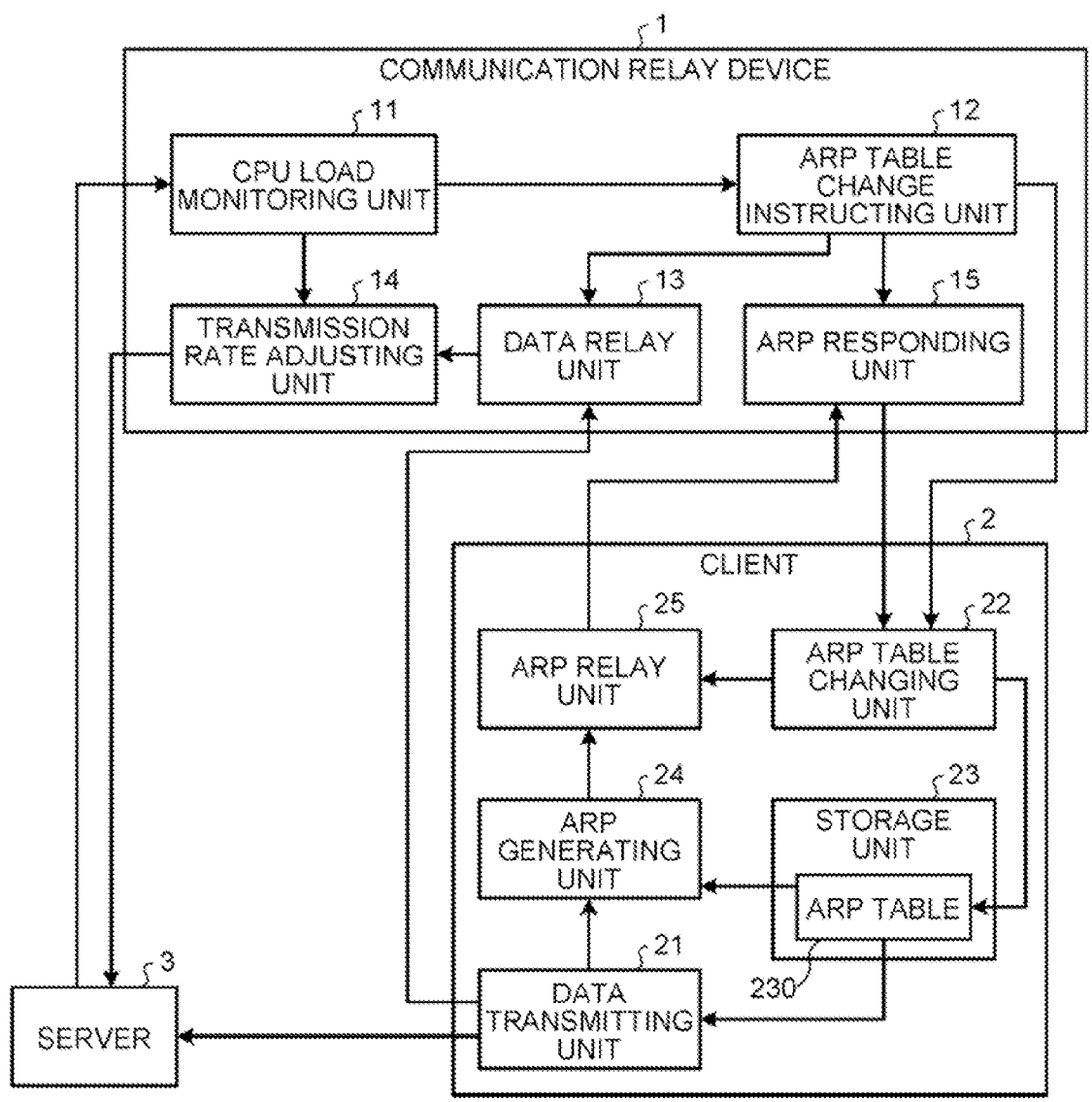
FIG. 11 is a block diagram of a communication relay system including a communication relay device according to a second embodiment.

FIG. 11 is a block diagram of a communication relay system including a communication relay device according to a second embodiment. The communication relay system according to the present embodiment has a configuration for implementing mitigation of the processing load of the server 3 which is caused due to reception data when the client 2 does not support the GARP. In the following description, a description of the same function as in the first embodiment will not be made.

The communication relay device 1 according to the present embodiment has a configuration in which an ARP responding unit 15 is added to the communication relay device according to the first embodiment. In addition, the client 2 further includes an ARP relay unit 25 and an ARP generating unit 24 in addition to the configuration of the client according to the first embodiment.

Here, upon receiving a data relay function activation notice from the CPU load monitoring unit 11, the ARP table change instructing unit 12 notifies the ARP table changing unit 22 of an instruction (hereinafter, referred to as an "ARP table clear message") to delete information of the IP address and the corresponding MAC address of the server 3 from the ARP table 230. Here, in the present embodiment, the GARP is used as the ARP table clear message. In this case, the ARP table change instructing unit 12 transmits the GARP having content illustrated in FIG. 12 to the ARP table changing unit 22. FIG. 12 is a diagram illustrating content of the GARP generated at the time of activation of the data relay function in the second embodiment. As illustrated in FIG. 12, the IP address of the server 3 is recorded in the transmission source IP address and the transmission destination IP address. Thus, the client 2 can determine that the ARP it the GARP. Farther, the MAC address of the server 3 is recorded in the transmission source MAC address and the transmission destination MAC address.

Further, the ARP table change instructing unit 12 notifies the data relay unit 13 and the ARP responding unit 15 of the IP address and the MAC address of the overloaded server 3.

Further, upon receiving a data relay function deactivation notice from the CPU load monitoring unit 11, the ARP table change instructing unit 12 notifies the ARP table changing unit 22 of the ARP table clear message. In this case, the ARP table change instructing unit 12 transmits the GARP having content illustrated in FIG. 13 to the ARP table changing unit 22. FIG. 13 is a diagram illustrating content of the GARP generated at the time of deactivation of the data relay function in the second embodiment. As illustrated in FIG. 13, the IP address of the server 3 is recorded in the transmission source IP address and the transmission destination IP address. Thus, the client 2 can determine that the ARP is the GARP. Further, the MAC address of the communication relay device 1 is recorded in the transmission source MAC address and the transmission destination MAC address.

The ARP responding unit 15 holds information of the IP address and the MAC address of the overloaded server 3, which is received from the ARP table change instructing unit 12. The ARP responding unit 15 receives the ARP request from the ARP relay unit 25 of the client 2. Then, when the ARP request requests the MAC address of the overloaded server 3, the ARP responding unit 15 transits an ARP response including information representing that the MAC address corresponding to the IP address of the server 3 is the MAC address: of the communication relay device 1 to the client 2.

The ARP table changing unit 22 of the client 2 receives the ARP table clear message which is the GARP from the ARP table change instructing unit 12. Then, the ARP table changing unit 22 deletes the IP address and the MAC address corresponding to the IP address which are recorded in the transmission source IP address and the transmission destination IP address of the GARP from the ARP table 230.

In addition, when the transmission source MAC address and the transmission destination MAC address of the received GARP are not the MAC address of the communication relay device 1, the ARP table changing unit. 22 notifies the ARP relay unit 25 of the ARP relay function activation instruction. However, when the transmission source MAC address end the transmission destination MAC address of the received GARP is the MAC address of the communication relay device 1, the ARP table changing unit 22 notifies the ARP relay unit 25 of the ARP relay function deactivation instruction.

Here, when the ARP relay unit 25 is notified of the ARP relay function activation instruction, the ARP table changing unit 22 receives the ARP response including information representing that the MAC address corresponding to the IP address of the server 3 is the MAC address of the communication relay device 1. Then, the ARP table changing unit 22 registers the IP address of the server 3 and the MAC address of the communication relay device 1 in the ARP table 230 in association with each other.

At the time of data transmission to the server 3, when it is determined that the IP address and the corresponding MAC address of the server 3 do not remain registered with reference to the ARP table 230, the data transmitting unit 21 requests the ARP generating unit 24 to generate the ARP request.

Further, at the time of data transmission to the server 3, when it is determined that the IP address and the corresponding MAC address of the server 3 remain registered with reference to the ARP table 230, the data transmitting unit 21 transmits data toward the registered MAC address.

The ARP generating unit 24 receives an ARP request generation instruction from the data transmitting unit 21, and generates an ARP request that requests a MAC address corresponding to a designated IP address. In the ARP request generated by the ARP generating unit 24, the destination MAC address is broadcast. Then, the ARP generating unit 24 transmits the generated ARP to the ARP relay unit 25.

The ARP relay unit 25 receives the ARP relay function activation or deactivation instruction from the ARP table changing unit 22. Then, the ARP relay unit 25 performs activation or deactivation of the ARP relay function according to the instruction.

The ARP relay unit 25 receives the ARP request from the ARP generating unit 24. Then, when the ARP relay function remains activated, the ARP relay unit 25 rewrites the destination MAC address of the ARP request to the MAC address of the communication relay device 1 to be a unicast message. Thereafter, the ARP relay unit. 25 transmits the ARP request to the communication relay device 1.

However, when the ARP relay function does not remain activated, the ARP relay unit 25 transmits the received ARP request in a broadcast manner.

Figure 14:
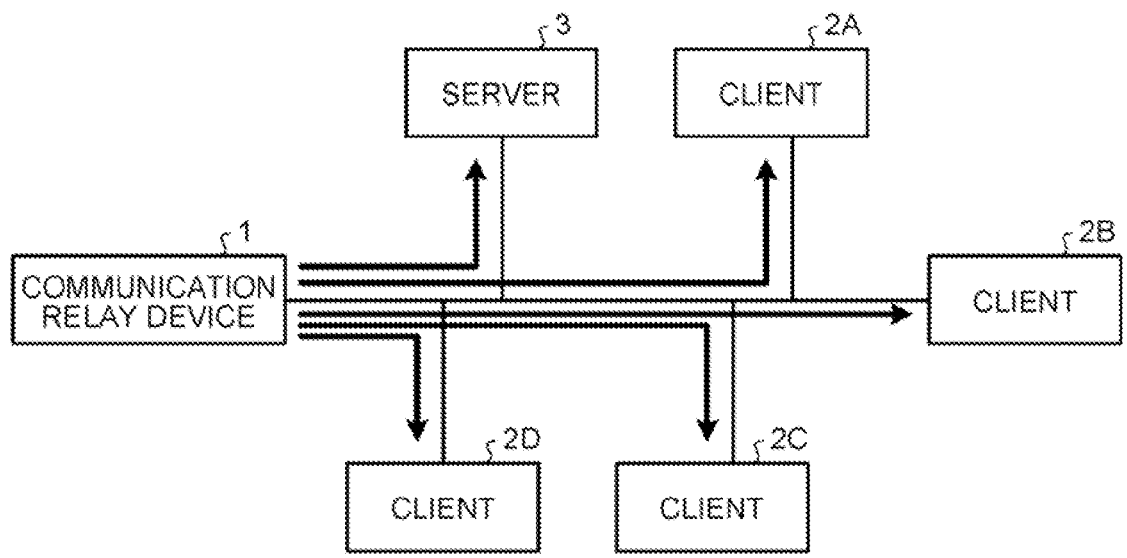
FIG. 14 is a diagram illustrating a transmission state of an ARP table clear message when an overload is imposed on a server.
Figure 15:
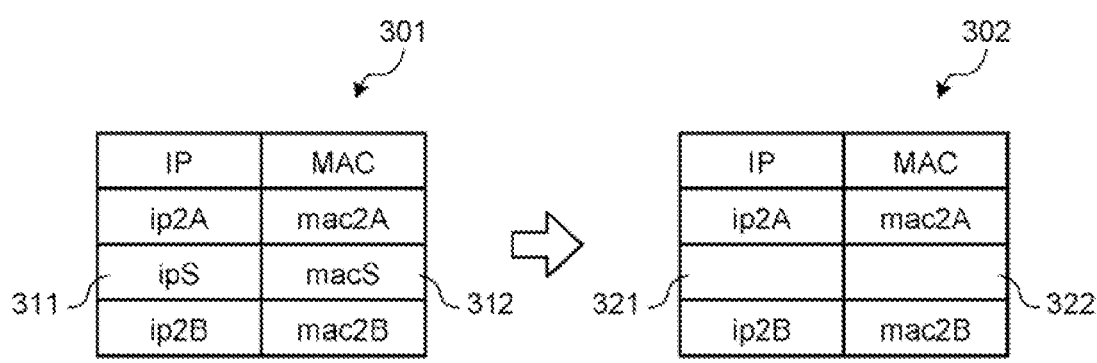
FIG. 15 is a diagram illustrating transition of an ARP table when an overload is imposed on a server.
Figure 16:
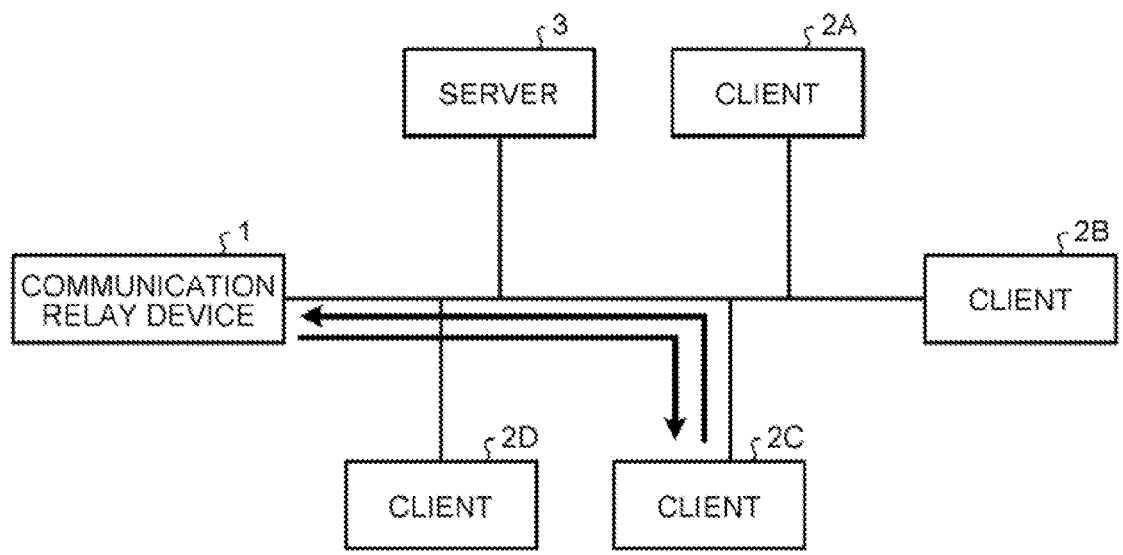
FIG. 16 is a diagram illustrating a state in which an ARP request and an ARP response are transmitted and received.
Figure 17:
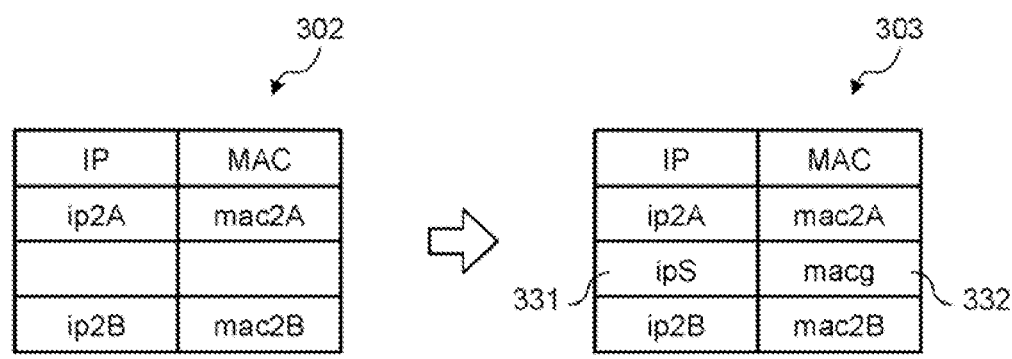
FIG. 17 is a diagram illustrating transition of an ARP table by transmission and reception of an ARP request and an ARP response.
Figure 18:
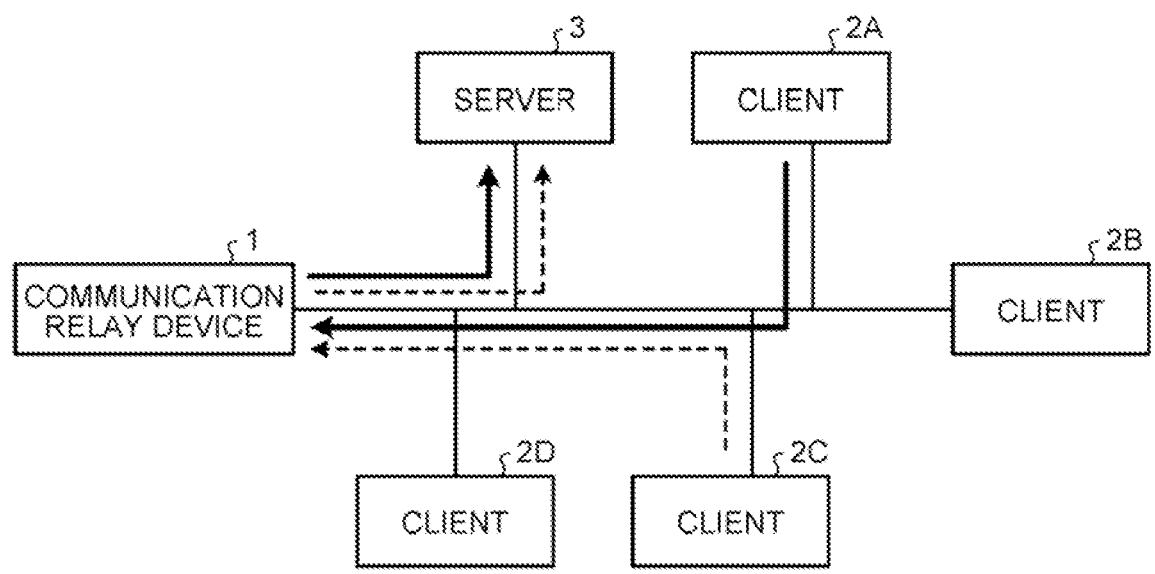
FIG. 18 is a diagram illustrating a data transmission state when a transmission rate is adjusted.
Figure 19:
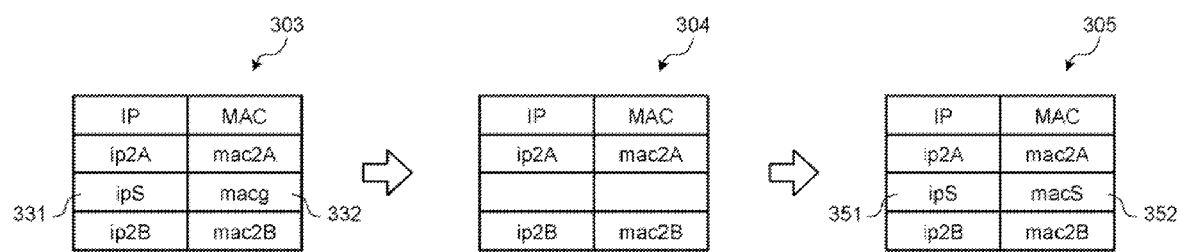
FIG. 19 is a diagram illustrating transition of an ARP table when a low load is imposed on a server.

Next, transition of the flow of data and transition of the ARP table when an overload is imposed on the server 3 and when a low load is imposed on the server 3 will be described with reference to FIGS. 14 to 19. FIG. 14 is a diagram illustrating: a transmission state of the ARP table clear message when an overload is imposed on the server. FIG. 15 is a diagram illustrating transition of the ARP table when an overload is imposed on the server. FIG. 16 is a diagram illustrating a state in which the ARP request and the ARP response are transmitted and received. FIG. 17 is a diagram illustrating transition of the ARP table by transmission and reception of the ARP request and the ARP response. FIG. 18 is a diagram illustrating a data transmission state when the transmission rate is adjusted. FIG. 19 is a diagram illustrating transition of the ARP table when a low load is imposed on the server.

Here, the description will proceed in connection with an example in which clients 2A to 2D are arranged as the client 2. The communication relay device 1, the clients 2A to 2D, and the server 3 are connected to one another via the 12 network. In the following, macg is used as the MAC address of the communication relay device 1. Further, ip2A to ip2D are used as IP addresses of the clients 2A to 2D, respectively, and mac2A to mac2D are used as the MAC addresses of the clients 2A to 2D. Further, ipS is used as the IP address of the server 3, and macS is used as the MAC address.

Here, when an overload is not imposed on the server 3, the state of FIG. 5 is formed, similarly to the first embodiment. Then, when the communication relay device 1 detects an overload of the CPU of the server 3 in the state of FIG. 5, the communication relay device 1 broadcasts the ARP table clear message: used to delete the IP address and the corresponding MAC address of the server 3 as illustrated in FIG. 17. In the present embodiment, the GARP is used as the ARP table clear message. As a result, the IP address and the corresponding MAC address of the server 3 are deleted from the ARP table 230 in each of the clients 2A to 2D.

The ARP table 230 in the client 2C will be described as an example. A table 301 of FIG. 15 represents the ARP table 230 of the client 2C before an overload is imposed on the server. A table 302 represents the ARP table 230 of the client 2C after an overload is imposed on the server in the table 301, ipS is recorded in an IP column 311 as the IP address of the server 3, and macS is recorded in a corresponding MAC column 312 as the MAC address of the server 3. Then, when the client 2 receives the GARP which is the ARP table clear message from the communication relay device 1, the table 301 is rewritten as in the table 302. In the table 302, the IP address and the corresponding MAC address of the server 3 remain deleted from an IP column 321 and a MAC column 322. The ARP table 230 of each of the clients 2A to 2D is rewritten as described above.

Thereafter, when data is transmitted to the server 3, the client 2C refers to the ARP table 230 having the state of the table 302. Then, since the IP address and the corresponding MAC address of the server 3 are not present in the ARP table 230, the client 2C transmits the ARP request that requests the MAC address corresponding to the IP address of the server 3 to the communication relay device 1 as illustrated in FIG. 16. Then, in response to the ARP request received from the client C, the communication relay device 1 transmits the ARP response in which the MAC address or the communication relay device 1 is designated as the MAC address corresponding to the IP address of the server 3 to the client 2C. Upon receiving the ARP response, the client 2C registers the MAC address of the communication relay device 1 in the ARP table 230 in association with the IP address of the server 3.

The table 302 of FIG. 17 is the same as the table 302 of FIG. 15, and represents the ARP table 230 of the client 2C before the ARP response is received. Further, a table 303 represents the ARP table 230 of the client 2C after the ARP response is received in the table 302, the IP address and the corresponding MAC address of the server 3 do not remain registered. Then, when the client 2 receives the ARP response from the communication relay device 1, the table 302 is rewritten as in the table 303. In the table 303, ipS is recorded in an IP column 331 as the IP address of the server 3, and macg is recorded in a corresponding MAC column 332 as the MAC address of the communication relay device 1. The ARP table 230 of each of the clients 2A to 2D is rewritten as described above.

Thereafter, the clients 2A to 2D transmit data directed to the server 3 with reference to the ARP table. 230 having the state of the table 303, and thus the clients 2A to 2D actually transmit data directed to the server 3 to the communication relay device 1 as illustrated in FIG. 18. Then, the communication relay device 1 transmits data received from the clients 2A to 2D to the server 3 while adjusting the transmission rate. In FIG. 18, as an example, the flow of data when the client 2C transmits data toward the server 3 is indicated by a dashed line arrow, and the flow of data when the client 2A transmits data toward the server 3 is indicated by a solid line arrow.

In the state of FIG. 18, when the communication relay device 1 detects a low load of the CPU of the server 3, the communication relay device 1 broadcasts the GARP which is the ARP table clear message. As a result, the IP address and the corresponding MAC address of the server 3 are deleted from the ARP table 230 in each of the clients 2A to 2D. Thereafter, when data is transmitted to the server 3, the clients 2A to 2D broadcasts the ARP request, and receives the MAC address from the server 3, and thus the IP address of the server 3 and the corresponding MAC address are registered in the ARP table 230. As a result, the clients 2A to 2D transmit data directly to the server 3.

The table 303 of FIG. 19 is the some as the table 303 of FIG. 17, and represents the ARP table 230 of the client 20 when an overload is imposed on the server 3. Further, a table 304 represents the ARP table 230 of the client 2C after a low load is imposed on the server 3 and the ARP table clear message is received. Further, the table 304 represents the ARP table 230 of the client 2C after the ARP response is received from the server 3. In the table 303, ipS is recorded in an IP column 221 as the IP address of the server 3, and macg is recorded in a corresponding MAC column 222 as the MAC address of the communication relay device 1. Then, when the ARP table clear message is received from the communication relay device 1, the client 2 rewrites the table 303 as in the table 304. In the table 304, the IP address and the corresponding MAC address of the server 3 do not remain registered. Thereafter, when the ARP response is received from the server 3, the client 2 rewrites the table 304 as in a table 305. ipS is recorded in an IP column 351 as the IP address of the server 3, and macS is recorded in a corresponding MAC column 352 as the MAC address of the server 3. The ARP table 230 of each of the clients 2A to 2D is rewritten as described above.

Thereafter, the clients 2A to 2D transmit data directed to the server 3 with reference to the ARP table 230 having the state of the table 203 In this case, the clients 2A to 2D transmit data directed to the server 3 directly to the server 3 as illustrated in FIG. 5 illustrating the state before the server is overloaded.

Figure 20:
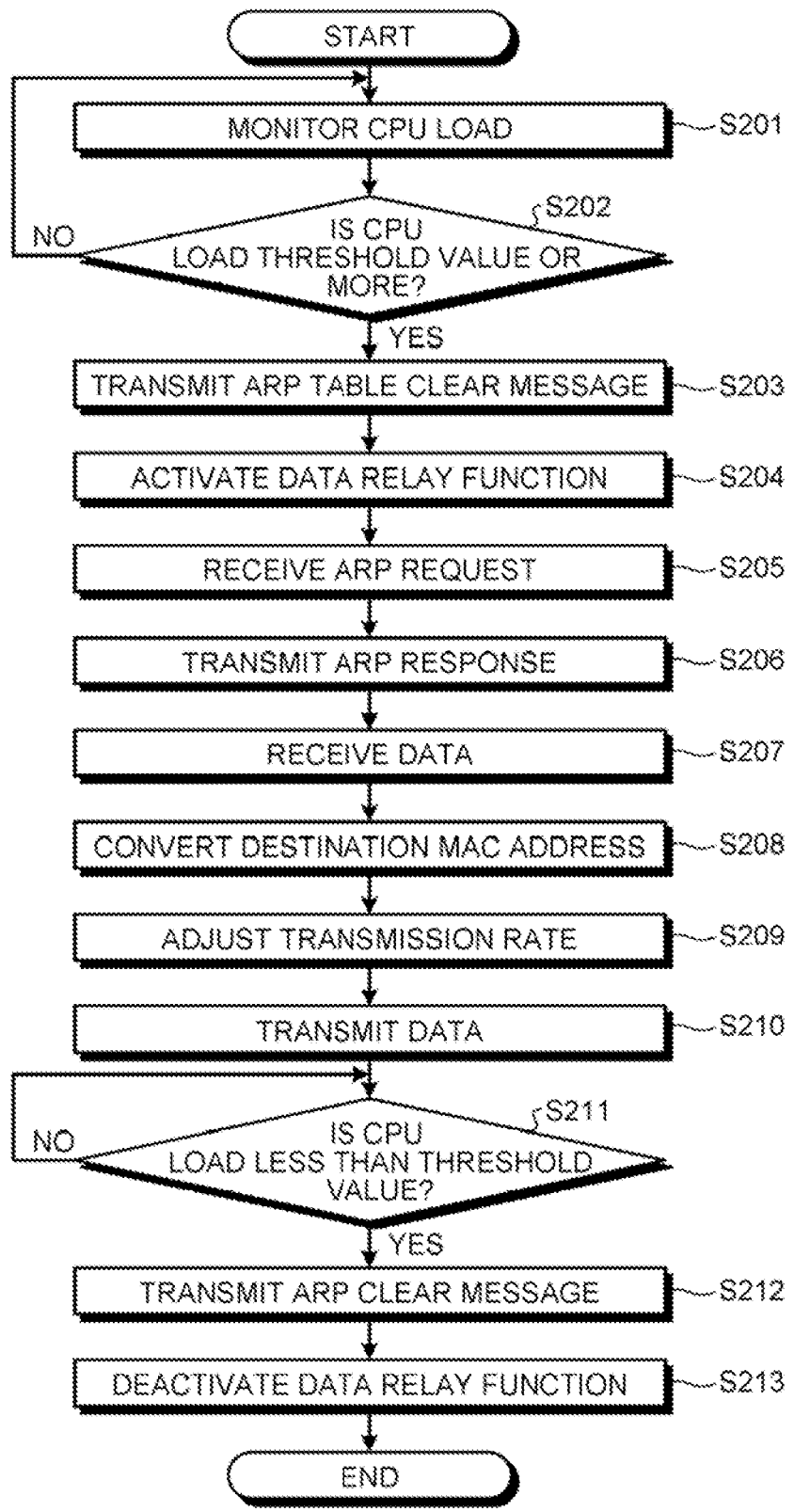
FIG. 20 is a flowchart illustrating a data relay process by a communication relay device according to the second embodiment.

Next, a data relay process by the communication relay device 1 according to the second embodiment will be described with reference to FIG. 20. FIG. 20 is a flowchart illustrating a data relay process by the communication relay device according to the second embodiment.

The CPU load monitoring unit 11 monitors the CPU load of the server 3 (step S201). Then, the CPU load monitoring unit 11 determines whether or not the CPU load is a threshold value or more (step S202). Here, when the CPU load is less than the threshold value (No in step S202), the CPU load monitoring unit 11 returns to step S201.

However, when the CPU load is the threshold value or more (Yes in step S202), the CPU load monitoring unit 11 notifies the ARP table change instructing unit 12 of activation of the data relay function. In turn, the ARP table change instructing unit. 12 transmits the GARP which is the ARP table clear message in a broadcast manner (step S203). In the ARP table clear message, a MAC address of a device other than the communication relay device 1 is designated as the transmission source MAC address and the transmission destination MAC address.

Further, the ARP table change instructing unit 12 notifies the data relay unit 13 of activation of the data relay function together with the IP address and the MAC address of the server 3. In turn, the data relay unit 13 holds the IP address and the MAC address of the server 2 and activates the data relay function (step S204).

Thereafter, the ARP responding unit 15 receives the ARP request that: requests the MAC address corresponding to the IP address of the server 3 from the client 2 (step S205). The ARP responding unit 15 transmits the ARP response that notifies the MAC address of the communication relay device 1 as the MAC address corresponding to the IP address of the server 3 to the client 2 (step S206).

Thereafter, the data relay unit 13 receives date directed to the server 3 from the client 2 (step S207). Then, the data relay unit 13 converts the destination MAC address of the received data into the MAC address of the server 3 using the held IP address and the held MAC address of the server 3 (step S208). Thereafter, the data relay unit 13 outputs data to the transmission rate adjusting unit 14.

The transmission rate adjusting unit 14 adjusts the transmission rate according to the CPU load of the server 3 (step S209). Then, the transmission rate adjusting unit 14 transmits data to the server 3 (step S210).

Thereafter, the CPU load monitoring unit 11 determines whether or not the CPU load is less than the threshold value (step S211). Here, when the CPU load is the threshold value or more (No in step S211), the CPU load monitoring unit 11 repeats step S211.

However, when the CPU load is less than the threshold value (Yes in step S211), the ARP table change instructing unit 12 transmits the GARP which is the ARP table clear message to the client 2 (step S212). In the ARP table clear message, the MAC address of the communication relay device 1 is designated as the transmission source MAC address and the transmission destination MAC address. Then, the ARP table change instructing unit 12 notifies the data relay device of deactivation of the data relay function. In turn, the data relay unit 13 deactivates the data relay function (step S213).

Here, in the flow of FIG. 20, a series of processes until a low load is imposed on the server after an overload is imposed on the server has been described. However, the communication relay device 1 actually repeats the flow of FIG. 20.

Figure 21:
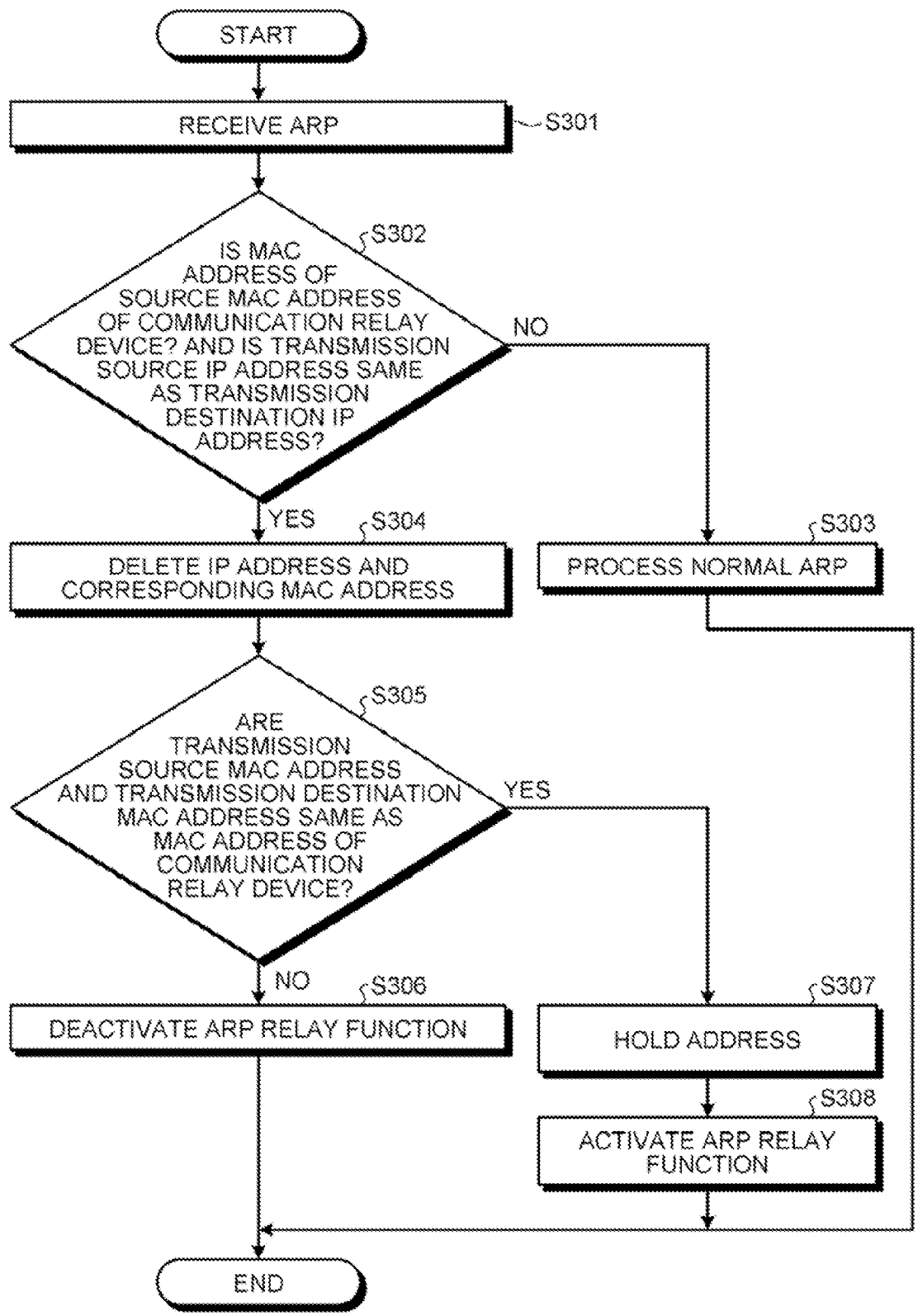
FIG. 21 is a flowchart illustrating a process in a client according to the second embodiment when an ARP is received.

Next, a process in the client 2 according to the present embodiment when the ARP table clear message is received will be described with reference to FIG. 21. FIG. 21 is a flowchart illustrating a process in the client according to the second embodiment when the ARP is received.

The client 2 receives the ARE (step S301). The ARP table changing unit 22 determines whether or not the source MAC address of the received ARP is the MAC address of the communication relay device 1 and the transmission source IP address is the same as the transmission destination IP address (step 3302). Here, when the source MAC address is not the MAC address of the communication relay device 1 or when the transmission source IP address is not the same as the transmission destination IP address (No in step S302), the client 2 performs the normal ARP process (step S303).

However, when the source MAC address is the MAC address of the communication relay device 1 and the transmission source IP address is the same as the transmission destination IP address (Yes in step S302), the IP address and the corresponding MAC address of the server 3 are deleted from the ARP table (step S304).

Then, the ARP table changing unit 22 determines that the transmission source MAC address and the transmission destination MAC address are the MAC address of the communication relay device 1 (step S305). Here, when the transmission source MAC address and the transmission destination MAC address are not the MAC address of the communication relay device 1 (No in step S305), the ARP relay unit 25 deactivates the ARP relay function (step S306).

However, when the transmission source MAC address and the transmission destination MAC address are the MAC address of the communication relay device 1 (Yes an step S305), the ARP relay unit 25 acquires the IP address of the server 3 from the ARP table changing unit 22 and holds the acquired IP address of the server 3 (step S307). Thereafter, the ARP relay function is activated (step S308).

Figure 22:
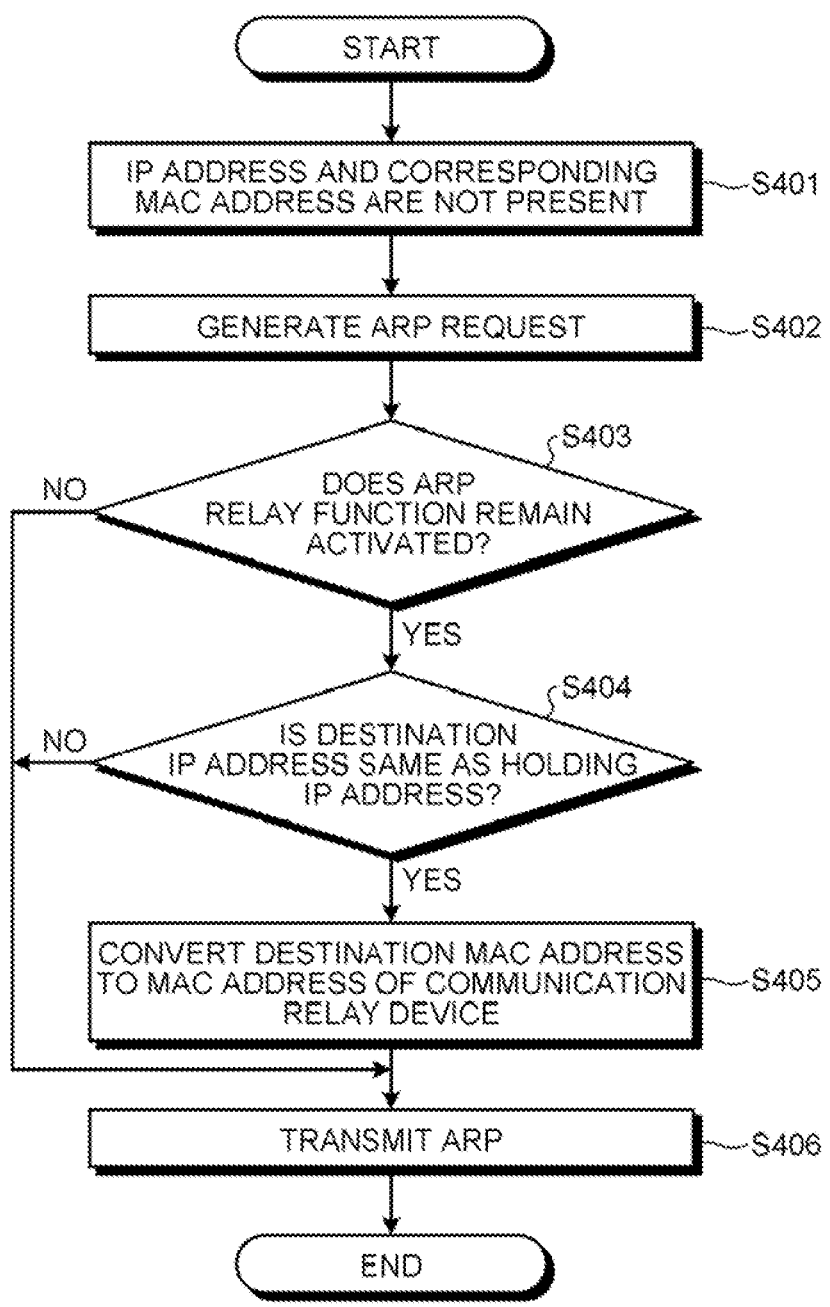
FIG. 22 is a flowchart illustrating an ARP request transmission process in a client according to the second embodiment.

Next, an ARP request transmission process in the client 2 according to the present embodiment will be described with reference to FIG. 22. FIG. 22 is a flowchart illustrating an ARP request transmission process in the client according to the second embodiment.

Here, when data is transmitted to the server 3, the data transmitting unit 21 refers to the ARP table 230, and confirms that the IP address and the corresponding MAC address of the server 3 are not present (step S401).

The ARP generating unit 24 generates the ARP request in which the destination MAC address is broadcast (step S402).

The ARP relay unit 25 receives the ARP request generated by the ARP generating unit 24, and determines whether or not the ARP function remains activated (step S403). Here, when the ARP function does not remain activated (No in step S403), the ARP relay unit 25 proceeds to step S406.

However, when the ARP function remains activated (Yes in step S403), the ARP relay unit 25 determines whether or not an IP address (an holding IP address in FIG. 22) of the overloaded server which is held matches with the destination IP address (step S404). Here, when the holding IP address is different from the destination IP address (No in step S404), the ARP relay unit 25 proceeds to seep S406.

However, when the holding IP address matches with the destination IP address (yes in step S404), the ARP relay unit 25 converts the destination MAC address of the ARP request to the MAC address of the communication relay device 1 (step S405). Then, the ARP relay unit 25 transmits the ARP request to the communication relay device 1 (step S406).

As described above, in the communication relay system accordion to the present embodiment, even when the client, does not correspond to the GARP, the ARP table of the client is rewritten, and the communication relay device receives data directed to the server 3, changes the transmission rate, and transmits the data to the server. Thus, even when the client does not corresponds to the GARP, it is possible to easily mitigate the processing load of the information processing device, which is caused due to reception data.

According to an embodiment of the present invention, there is an advantage that a processing load of an information processing device by reception data can be easily mitigated.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority or the invention. Although the embodiments of the present invention have been described in detail, it should be understood that the various changes, substitutions, and alterations could be made hereto without departing from the spirit and scope of the invention.

What is claimed is:

1. A communication relay device, comprising:
   a load monitoring unit that monitors a load of a first information processing device that receives and processes data;
   a correspondence instructing unit that instructs a second information processing device, which transmits data in which an IP address of the first information processing device is designated as a transmission destination toward a MAC address associated with the designated IP address, to associate an IP address of the first information processing device with a MAC address of the communication relay device when the load of the first information processing device is a threshold value or more;
   a data receiving unit that receives the data in which the IP address of the first information processing device is designated as the transmission destination from the second information processing device; and
   a transmitting unit that transmits the data received by the data receiving unit to the first information processing device at a predetermined transmission rate.

2. The communication relay device according to claim 1, wherein the correspondence instructing unit changes a correspondence between an IP address and a MAC address by updating an ARP table of the second information processing device.

3. The communication relay device according to claim 2, wherein the correspondence instructing unit updates the ARP table of the second information processing device using a gratuitous address resolution protocol (GARP).

4. The communication relay device according to claim 1, wherein when the load of the first information processing device is the threshold value or more, the correspondence instructing unit instructs the second information processing device to delete a correspondence between the IP address and the MAC address of the first information processing device in the second information processing device, receives a notice request for a MAC address corresponding to the IP address of the first information processing device from the second information processing device, and instructs the second information processing device to associate the IP address of the first information processing device with the MAC address of the communication relay device by notifying of the address of the communication relay device as the MAC address corresponding to the IP address of the first information processing device.

5. The communication relay device according to claim 1, wherein when the load of the first information processing device is less than the threshold value, the correspondence instructing unit instructs the second information processing device to associate the IP address of the first information processing device with the MAC address of the first information processing device.

6. A communication relay system, comprising:
   a first information processing device that processes data;
   a second information processing device that transmits data to the first information processing device; and
   a communication relay device,
   wherein the communication relay device includes
   a load monitoring unit that monitors a load of a first information processing device that receives and processes data;
   a correspondence instructing unit that instructs a second information processing device to associate an IP address of the first information processing device with a MAC address of the communication relay device when the load of the first information processing device is a threshold value or more;

a data receiving unit that receives the data in which the IP address of the first information processing device is designated as the transmission destination from the second information processing device; and a transmitting unit that transmits the data received by the data receiving unit to the first information processing device at a predetermined transmission rate, and wherein the second information processing device includes a storage unit that stores an IP address and a corresponding MAC address of the first information processing device;

a data transmitting unit that transmits data in which the IP address of the first information processing device is designated as a transmission destination toward a MAC address associated with the designated IP address; and a correspondence changing unit that receives a correspondence instruction from the relay device, and stores a MAC address of the relay device in the storage unit in association with the IP address of the first information processing device.

7. The communication relay system according to claim 6, wherein when the load of the first information processing device is the threshold value or more, the correspondence instructing unit of the relay device instructs the second information processing device to delete a correspondence between the IP address and the MAC address of the first information processing device in the second information processing device, receives a notice request for a MAC address corresponding to the IP address of the first information processing device from the second information processing device, and instructs the second information processing device to associate the IP address of the first information processing device with the MAC address of the communication relay device by notifying of the address of the communication relay device as the MAC address corresponding to the IP address of the first information processing device, the second information processing device further includes
a transmitting unit that transmits the notice request for the MAC address corresponding to the IP address of the first information processing device to the relay device when information of the MAC address corresponding to the IP address of the first information processing device is not present in the storage unit, and the correspondence changing unit receives a deletion instruction on a correspondence of the IP address and the MAC address of the first information processing device, deletes the stored correspondence of the IP address and the MAC address of the first information processing device from the storage unit, receives an instruction from the relay device, and causes a MAC address of the relay device to be stored in the storage unit in association with the IP address of the first information processing device.

8. A method of controlling a communication relay device, the method comprising:

monitoring a load of a first information processing device that receives and processes data;

instructing a second information processing device, which transmits data in which an IP address of the first information processing device is designated as a transmission destination toward a MAC address associated with the designated IP address, to associate an IP address of the first information processing device with a MAC address of the communication relay device when the load of the first information processing device is a threshold value or more;

receiving the data in which the IP address of the first information processing device is designated as the transmission destination from the second information processing device; and transmitting the received data to the first information processing device at a predetermined transmission rate.

9. A non-transitory computer-readable recording medium having stored therein a program for causing a computer to execute a relaying communication process comprising:

monitoring a load of a first information processing device that receives and processes data;

instructing a second information processing device, which transmits data in which an IP address of the first information processing device is designated as a transmission destination toward a MAC address associated with a designated IP address, to associate an IP address of the first information processing device with a MAC address of a relay processing device when the load of the first information processing device is a threshold value or more;

receiving the data in which the IP address of the first information processing device is designated as the transmission destination from the second information processing device; and transmitting the received data to the first information processing device at a predetermined transmission rate.

* * * * *